United States Patent
Staaden (10) Patent No.: US 7,996,180 B2
(45) Date of Patent: Aug. 9, 2011

(54) METHOD AND DEVICE FOR DETERMINING GEOMETRIC DATA OF A CONICAL MEASUREMENT OBJECT

(75) Inventor: Ulrich Staaden, Aalen (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 158 days.

(21) Appl. No.: 12/546,825

(22) Filed: Aug. 25, 2009

(65) Prior Publication Data

US 2010/0082289 A1    Apr. 1, 2010

Related U.S. Application Data

(63) Continuation of application No. PCT/EP2008/001026, filed on Feb. 11, 2008.

(30) Foreign Application Priority Data

Mar. 2, 2007 (DE) .......................... 10 2007 011 603

(51) Int. Cl.
*G06F 19/00* (2006.01)
(52) U.S. Cl. ....................................................... 702/155
(58) Field of Classification Search .................. 702/155, 702/150, 182–185, 188
See application file for complete search history.

(56) References Cited

U.S. PATENT DOCUMENTS

| | | | |
|---|---|---|---|
| 6,587,810 B1 | 7/2003 | Guth et al. | |
| 7,336,375 B1 * | 2/2008 | Faul et al. | 356/604 |
| 2003/0067461 A1 | 4/2003 | Fletcher et al. | |
| 2003/0236645 A1 | 12/2003 | Santic | |
| 2005/0203930 A1 | 9/2005 | Bukowski et al. | |

FOREIGN PATENT DOCUMENTS

| | | |
|---|---|---|
| DE | 196 00 002 A1 | 7/1996 |
| DE | 198 21 372 A1 | 11/1999 |
| DE | 102 03 200 C1 | 8/2003 |
| DE | 103 15 364 B3 | 7/2004 |
| DE | 10 2005 030 274 A1 | 12/2006 |

OTHER PUBLICATIONS

A. Weckenmann et al., Coordinate measuring technology: flexible measurement strategies for dimension, shape and position, 1999; 12 pages.

* cited by examiner

*Primary Examiner* — Edward Raymond
(74) *Attorney, Agent, or Firm* — Harness, Dickey & Pierce, P.L.C.

(57) ABSTRACT

Determining geometric data of a conical measurement object comprises determining spatial coordinates at a plurality of measurement points of the measurement object. At least six spatial coordinates are determined on at least six different measurement points. Element parameters of a tangential conical substitute element are determined by means of a system of equations which describes difference values between the spatial coordinates and the tangential conical substitute element. The difference values are modeled by means of at least two difference parameters whose sum represents a perpendicular spacing between the tangential conical substitute element and a spatial coordinate. Geometric data of the conical measurement object is determined using the substitute element.

13 Claims, 4 Drawing Sheets

METHOD AND DEVICE FOR DETERMINING GEOMETRIC DATA OF A CONICAL MEASUREMENT OBJECT

CROSSREFERENCES TO RELATED APPLICATIONS

This application is a continuation of international patent application PCT/EP2008/001026 filed on Feb. 11, 2008 designating the U.S., which international patent application has been published in German language and claims priority from German patent application DE 10 2007 011 603.0 filed on Mar. 2, 2007. The entire contents of these prior applications are incorporated herein by reference.

BACKGROUND OF THE INVENTION

The present invention relates to a method and a device for determining geometric data of a conical measurement object.

For quality control of industrially produced workpieces, the workpieces are often examined or measured by means of coordinate measuring machines in order to check if the workpieces correspond to the specifications. For this purpose, a workpiece to be measured is placed in the measurement volume of a coordinate measuring machine. The coordinate measuring machine has a measuring head, often in the form of a tactile probe head, by means of which defined measurement points of the workpiece are scanned. Due to the defined position of the measurement object within the measurement volume, spatial coordinates of the measurement point can then be determined by means of the position of the measuring head within the measurement volume. When the spatial coordinates are determined at a plurality of measurement points, it is possible to determine geometric data of the measurement object, such as the circumference or the diameter of a bore or the length of a side.

However, measurement errors of different causes are superposed on each measurement value. Some measurement errors can be predicted, for example on the basis of a change in room temperature. Other measurement errors, however, are unknown. Moreover, each workpiece has individual manufacturing tolerances. Coordinate measuring technology is therefore facing the challenge of acquiring unknown manufacturing tolerances of the workpieces even when the superposed and at least partially unknown measurement errors are of the same order of magnitude.

When a measurement object is measured by means of a coordinate measuring machine at a plurality of measurement points, a "point cloud" of spatial coordinates is obtained as a result. If these points are connected notionally, a metrological image of the measurement object is obtained. This metrological image differs from the ideal measurement object as a result of the measurement errors and as a result of the manufacturing tolerances. Since the determination of the geometric data on the metrological image can vary substantially depending on which measurement points are used, an ideal substitute element matching the "point cloud" as good as possible is often determined. The substitute element allows the geometric data to be determined with higher reproducibility and a better basis for comparisons.

There are several substitute elements that are more or less well suited depending on the shape of the measurement object and on the geometric data being sought. Known substitute elements are Gaussian elements, minimum elements, envelope elements and inscribed elements. In the case of a Gaussian element, the sum of the squares of the deviations between measurement points and the ideal substitute element is minimized. Therefore, there is exactly one Gaussian substitute element for each specific point cloud. The same holds true for the minimum element, in the case of which the deviation of the maximum absolute value between substitute element and any desired measurement point is minimized. Gaussian and minimum elements can be uniquely determined both for "open" measurement objects or measurement regions (for example straight line or plane) and for "closed" measurement objects (for example circle, ball, cylinder).

The envelope element is the smallest possible substitute element that encloses all the measurement points. The inscribed element is the largest possible substitute element where all the measurement points lie outside the substitute element. Since the envelope and the inscribed substitute elements touch at least some measurement points, they are often called fitting or tangential substitute elements.

Envelope and inscribed elements are well suited for determining geometric data such as location, orientation, diameter, length and other pairing dimensions. In the case of conical measurement objects, however, envelope or inscribed substitute elements could only be determined if additional conditions (secondary conditions), such as the cone angle of the envelope or inscribed cone, had been defined in advance. Such secondary conditions, however, complicate the comparability of the measurements since the secondary conditions would always need to be considered.

DE 10 2005 030 274 A1 suggested a method and a device by means of which the envelope and inscribed cones of a conical measurement object can be uniquely determined without specifying a cone angle as secondary condition. The document proposes to use the point cloud initially to determine a first conical substitute element, in particular a minimum cone. Subsequently, the cone angle of the minimum cone is used to transform the measurement points of the point cloud such that the transformed measurement points form a substantially cylindrical intermediate element. A cylindrical substitute element in the form of an envelope cylinder or inscribed cylinder was determined for this intermediate element. In the next step, the longitudinal axis of the cylindrical substitute element is determined, and a further coordinate transformation of the measurement points is performed such that the cone apex of the originally determined minimum cone lies on the longitudinal axis of the cylindrical substitute element. Following thereupon, this minimum cone is displaced on the longitudinal axis of the cylindrical substitute element until the condition of envelope or inscription is fulfilled.

Thus, in the case of this method and the corresponding device, the envelope or inscribed cone is determined via the detour of a tangential cylindrical substitute element. The cone angle of the minimum cone is used as cone angle. The method leads to a uniquely determined substitute element, even without a prior secondary condition, and therefore avoids the above-mentioned disadvantages. However, this method is time-consuming and computation intensive, because a plurality of coordinate transformations and the determination of two substitute elements has to be carried out.

DE 198 21 372 A1 discloses a coordinate measuring machine and a method for controlling it, with a plurality of spatial coordinates being determined at a plurality of measurement points. Parameters of geometric elements, such as a circle or a plane, are stored in the controller of the coordinate measuring machine in order to define the measurement points to be scanned on the measurement object. The document proposes to store these parameters with reference to a respectively dedicated coordinate system of the geometric elements. This document, however, does not indicate a solution for the above-mentioned problems in the context of determining tangential substitute elements for conical measurement objects.

SUMMARY OF THE INVENTION

Against this background, it is an object of the present invention to provide a method and a device by means of which the geometric data of conical measurement objects can be determined more easily and quickly, but still using a uniquely defined substitute element.

According to a first aspect of the invention, there is provided a method for determining geometric data of a conical measurement object, the method comprising the steps of: (a) determining at least six spatial coordinates at least six different measurement points on the conical measurement object, (b) determining a tangential conical substitute element for the measurement object using the at least six spatial coordinates, and (c) determining the geometric data of the measurement object by means of the tangential conical substitute element, wherein step (b) comprises the substeps of (b1) defining at least six element parameters that represent a cone axis of the tangential conical substitute element, a cone angle of the tangential conical substitute element, and a suspension point of the tangential conical substitute element on the cone axis, and (b2) calculating the at least six element parameters using the at least six spatial coordinates and using a system of equations, wherein the system of equations describes difference values between the spatial coordinates and the tangential conical substitute element, wherein each difference value is modeled by means of at least two difference parameters whose sum represents a perpendicular spacing between the tangential conical substitute element and a spatial coordinate, and wherein a first one of the at least two difference parameters defines a solution condition in the form of a limit value, and a second one of the at least two difference parameters defines a solution condition in the form of an extreme value.

According to another aspect of the invention, there is provided a device for determining geometric data of a conical measurement object, comprising a moveable measuring head and position-measuring devices in order to determine a spatial position of the measuring head, comprising a memory for storing a plurality of spatial coordinates of a plurality of measurement points on the measurement object, and comprising an evaluation unit for determining a tangential conical substitute element for the measurement object by using the spatial coordinates, and for determining the geometric data of the measurement object by means of the substitute element, wherein the memory is designed to store at least six spatial coordinates of at least six different measurement points of the measurement object, wherein the evaluation unit is designed to calculate at least six element parameters by using the at least six spatial coordinates and by using a system of equations, wherein the at least six element parameters represent a cone axis of the tangential conical substitute element, a cone angle of the tangential conical substitute element, and a suspension point of the tangential conical substitute element on the cone axis, wherein the system of equations describes difference values between the spatial coordinates and the tangential conical substitute element, wherein each difference value is modeled by means of at least two difference parameters whose sum represents a perpendicular spacing between the tangential conical substitute element and a spatial coordinate, and wherein a first one of the at least two difference parameters defines a solution condition in the form of a limit value, and a second one of the at least two difference parameters defines a solution condition in the form of an extreme value.

According to yet another aspect, there is provided a computer program product comprising a storage medium and program code stored on the storage medium, wherein the program code is designed to carry out a method according to the following steps, when the program code is executed on a computer: (a) determining at least six spatial coordinates at least six different measurement points on the conical measurement object, (b) determining a tangential conical substitute element for the measurement object using the at least six spatial coordinates, and (c) determining the geometric data of the measurement object by means of the tangential conical substitute element, wherein step (b) comprises the substeps of (b1) defining at least six element parameters that represent a cone axis of the tangential conical substitute element, a cone angle of the tangential conical substitute element, and a suspension point of the tangential conical substitute element on the cone axis, and (b2) calculating the at least six element parameters using the at least six spatial coordinates and using a system of equations, wherein the system of equations describes difference values between the spatial coordinates and the tangential conical substitute element, wherein each difference value is modeled by means of at least two difference parameters whose sum represents a perpendicular spacing between the tangential conical substitute element and a spatial coordinate, and wherein a first one of the at least two difference parameters defines a solution condition in the form of a limit value, and a second one of the at least two difference parameters defines a solution condition in the form of an extreme value.

The novel method, program and device enable the determination of a uniquely defined, tangential conical substitute element (in particular envelope or inscribed cone) without the detour via a cylindrical intermediate element and also without a priori knowledge of the cone angle or similar secondary conditions. In other words, for each point cloud of a conical measurement object, the novel method leads to a well defined tangential conical substitute element that is not dependent on the individual definition of secondary conditions. Consequently, the novel method and the novel device enable the determination of geometric data with a high level of reproducibility and comparability.

On the other hand, the novel method can be implemented more easily and quickly because the tangential conical substitute element can be calculated directly without the need for an intermediate element. The novel device can be implemented more easily on the basis of this direct calculation. Therefore, the above-mentioned object is completely achieved.

In a preferred refinement, the spatial coordinates are transformed before substep b2) such that the cone axis of the tangential conical substitute element falls at least approximately onto a coordinate axis of the coordinate measuring machine, in particular onto the z-axis.

This refinement includes an additional transformation step prior to the determination of the tangential conical substitute element. The advantage of this refinement is that the solution to the system of equations can be carried out in a simplified and quicker fashion. In order to carry out the coordinate transformation, a Gaussian or minimum cone is firstly determined in the preferred refinements, and the spatial coordinates are subsequently transformed such that the cone axis of the Gaussian or minimum cone falls onto the desired coordinate axis of the coordinate measuring machine.

In a further refinement, an envelope cone is determined as tangential conical substitute element by virtue of the fact that the first difference parameter defines a limit value less than or equal to zero, and the second difference parameter defines a minimum value as the extreme value.

As an alternative to this, an inscribed cone is determined as tangential conical substitute element by virtue of the fact that the first difference parameter defines a limit value of greater than or equal to zero, and the second difference parameter defines a maximum value as the extreme value.

These two refinements allow to uniquely determine an envelope cone or an inscribed cone that correspond to the usual definitions, this being done very easily and without further secondary conditions.

In a further refinement, the system of equations represents the following relationship:

$$f_i = \cos(\phi) \cdot \sqrt{x_i^2 + y_i^2} - d - z_i \cdot \sin(\phi) - (+) t_i$$

with $f_i$ being the first difference parameter,
d being the second difference parameter,
$\phi$ being the cone angle of the tangential conical substitute element,
$t_i$ being the probe ball radius of a feeler used, if appropriate, and
$x_i, y_i, z_i$ being the spatial coordinates of a measurement point relative to the suspension point of the tangential conical substitute element.

In this refinement, the system of equations is obtained by formulating the above relationship for at least six different spatial coordinates. This refinement is particularly advantageous for applications where the cone angle of the conical substitute element is very large, because, even for very large cone angles, the resulting system of equations possesses a uniquely determined solution that can be determined by means of customary solution algorithms (numerically, iteratively).

As an alternative or in addition to this, in a further refinement, the system of equations represents the following relationship:

$$f_i = \cos(\phi) \cdot (\sqrt{x_i^2 + y_i^2} - R) - d - z_i \cdot \sin(\phi) - (+) t_i$$

with $f_i$ being the first difference parameter,
d being the second difference parameter,
$\phi$ being the cone angle of the tangential conical substitute element,
R being the radius of the tangential conical substitute element at the suspension point,
$t_i$ being the probe ball radius of a feeler used, if appropriate, and
$x_i, y_i, z_i$ being the spatial coordinates of a measurement point relative to the suspension point of the tangential conical substitute element.

This refinement is particularly advantageous in cases where the conical substitute element has a relatively small cone angle, because even for very small cone angles, this refinement enables a uniquely determined solution to the system of equations that can be found by means of customary algorithms.

In a further refinement, the cone angle of the tangential conical substitute element is estimated before substep b2), in order to obtain an estimated cone angle of the tangential conical substitute element, and the suspension point of the tangential conical substitute element is defined as a function of the estimated cone angle.

This refinement enables an easy selection between the two previously mentioned relationships before the corresponding systems of equations are solved. It is advantageous to define a threshold value that lies between 10° and 80°, for example at 45°. (In this case, the cone angle is the angle between the cone axis and the circumscribed surface of the cone. When the entire aperture angle of the cone is used as reference variable, the limit value preferably lies between 10° and 170°.)

When the estimated cone angle is greater than the threshold value, the first of the two relationships specified above is advantageously used in order to set up the system of equations. When the estimated cone angle is smaller than the selected threshold value, it is advantageous to use the last named relationship in order to set up the system of equations. In all conceivable scenarios, this refinement leads to a fast and unique determination of the tangential conical substitute element.

In a further refinement, at least one of the following variables is determined by means of the second conical substitute element: position of the measurement object, alignment of the measurement object, length dimension of the measurement object, cone angle of the measurement object.

These geometric data are particularly important for the quality control of workpieces. The novel method and the novel device can be used to determine these geometric data very quickly and with a high level of reproducibility and comparability.

It goes without saying that the features mentioned above and those still to be explained below can be used not only in the respectively specified combination, but also in other combinations or on their own without departing from the scope of the present invention.

BRIEF DESCRIPTION OF THE DRAWINGS

Embodiments of the invention are illustrated in the drawing and will be explained in more detail in the following description. In the drawing.

DESCRIPTION OF PREFERRED EMBODIMENTS

Figure 1:
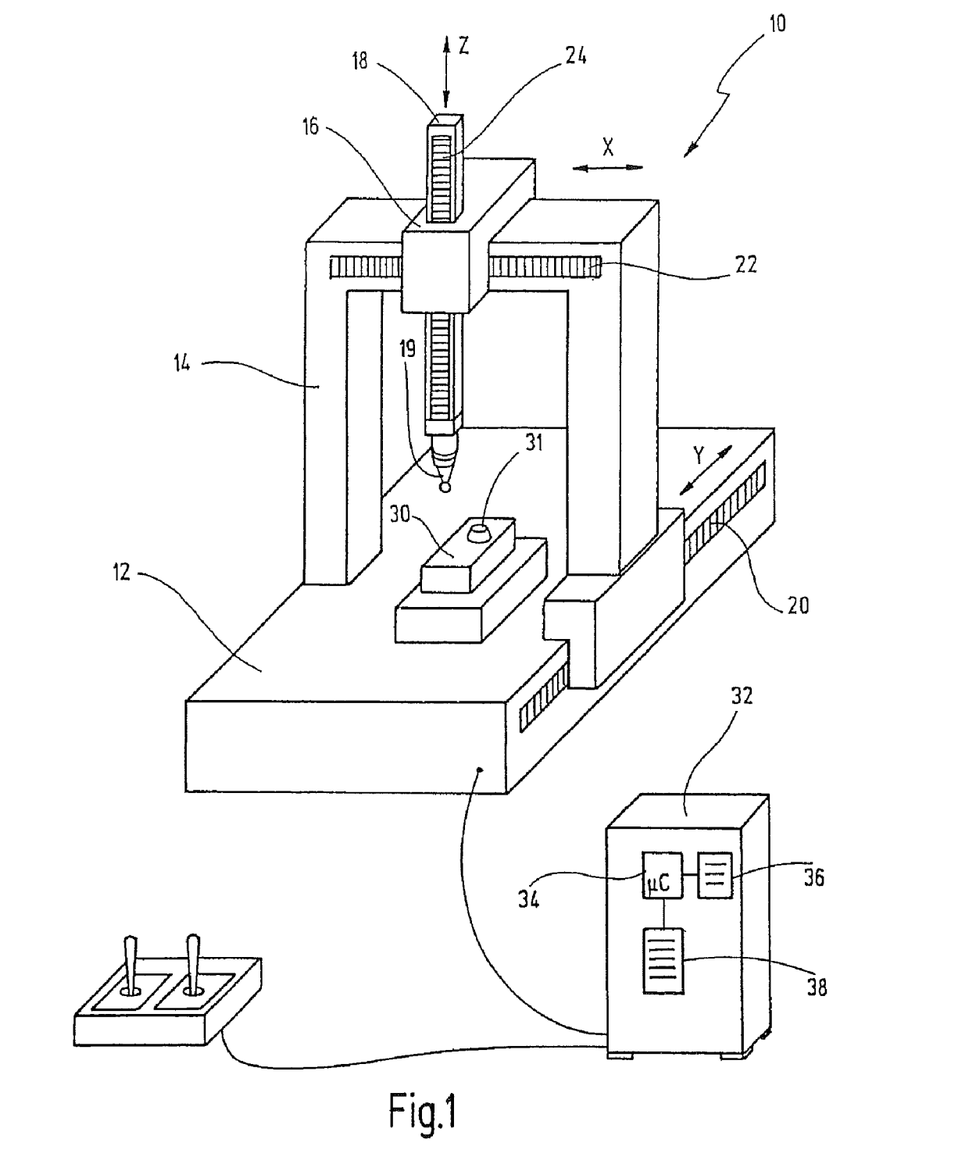
FIG. 1 shows an exemplary embodiment of a coordinate measuring machine comprising an evaluation unit that is designed according to the present invention.

A coordinate measuring machine is denoted in its entirety by reference numeral 10 in FIG. 1. The coordinate measuring machine 10 has a base 12 on which a portal 14 is arranged. The portal 14 can be moved in a longitudinal direction, which is denoted here as y-axis, on base 12. Arranged on the crossbeam of portal 14 is a slide 16 that can be moved in the x-direction. Arranged on the slide 16 is a quill 18 that can be moved in the z-direction. A probe head 19 comprising a feeler (not denoted here in more detail) is arranged on the lower free end of quill 18.

The coordinate measuring machine 10 has drives (not illustrated here in more detail) via which portal 14, slide 16 and quill 18 can be driven by motor in three spatial directions x, y, z. The probe head 19 can therefore be moved in three dimensions within a measurement volume.

Reference numerals 20, 22, 24 denote scales by means of which the respective axial position of the probe head 19 can be determined. The scales 20, 22, 24 are typically glass scales with a scaling that is scanned optically. The coordinate measuring machine 10 can, however, also have other position measuring devices, for example inductive measuring devices.

Furthermore, it may be pointed out for the sake of completeness that the present invention can be used not only in the case of coordinate measuring machines of portal design, but also in the case of other coordinate measuring machines, such as machines where the probe head is arranged on a horizontal arm. Furthermore, the invention can also be implemented in methods and devices that use a measuring head which measures in a contactless fashion, for example an optical measuring head. Finally, the present invention is not restricted to coordinate measuring machines in the narrower sense. It can likewise be used with machine tools and other devices by means of which geometric data of conical measurement objects is to be determined, such as computer tomographs for example.

A measurement object 30 comprising a conical portion 31 is arranged on base 12 of the coordinate measuring machine 10. The geometric data of portion 31 can be determined in an easy and reproducible fashion by means of the novel method. Geometric data are determined in a conventional way for non-conical portions of the measurement object 30. Reference may be made here for the purpose of a more detailed explanation to A. Weckenmann/B. Gawande, "Koordinatenmesstechnik: Flexible Messstrategien für Maß, Form and Lage" ["Coordinate measuring technology: flexible measurement strategies for dimension, shape and position"], Hanser-Verlag, Munich/Vienna, 1999, in particular to pages 172-179.

The coordinate measuring machine 10 has an evaluation and control unit 32 that controls the travel movements of the probe head 19 and executes the computational evaluation of the measured values obtained. The evaluation and control unit 32 is illustrated here in simplified fashion with a processor 34 and two memories 36, 38. Stored in the memory 36 is a computer program with program code whose execution on the processor 34 enables geometric data to be determined according to the novel method. Position measurements supplied by the measuring devices 20, 22, 24 are stored in the memory 38.

Figure 2:
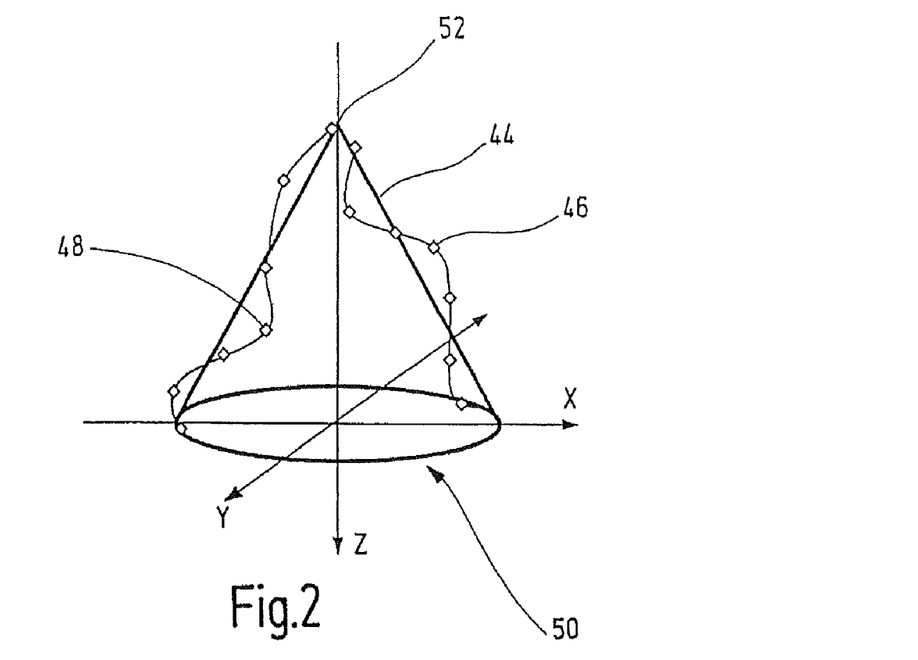
FIG. 2 shows a minimum cone as conical substitute element for a point cloud illustrated in simplified fashion.

Illustrated in FIG. 2 is a conical substitute element 44 that approximates a point cloud of a plurality of measurement points 46, 48. By way of example, the substitute element 44 is a minimum cone, i.e. a conical substitute element in the shape of a cone whose geometric dimensions correspond to the minimum approximation. This means that the deviation of maximum absolute value ("perpendicular spacing") is minimal between each measurement point 46 and the conical surface of the substitute element 44. It goes without saying that the measurement points 46, 48 are spatial coordinates in the three-dimensional coordinate system 50, which is defined here by the movement axes of the coordinate measuring machine 10. The geometric data of the minimum cone 44 are uniquely defined for a specific point cloud comprising measurement points 46, 48, i.e. there is only one minimum cone 44 in relation to a given point cloud. Consequently, it is possible to uniquely determine the position of the cone axis, the aperture angle of the substitute cone, the position of the cone apex 52 for an arbitrary point cloud.

However, the minimum cone is not optimum for all the measurement tasks, since the measurement points 46, 48 of the actual measurement object lie both outside and inside of the substitute element.

Figure 3:
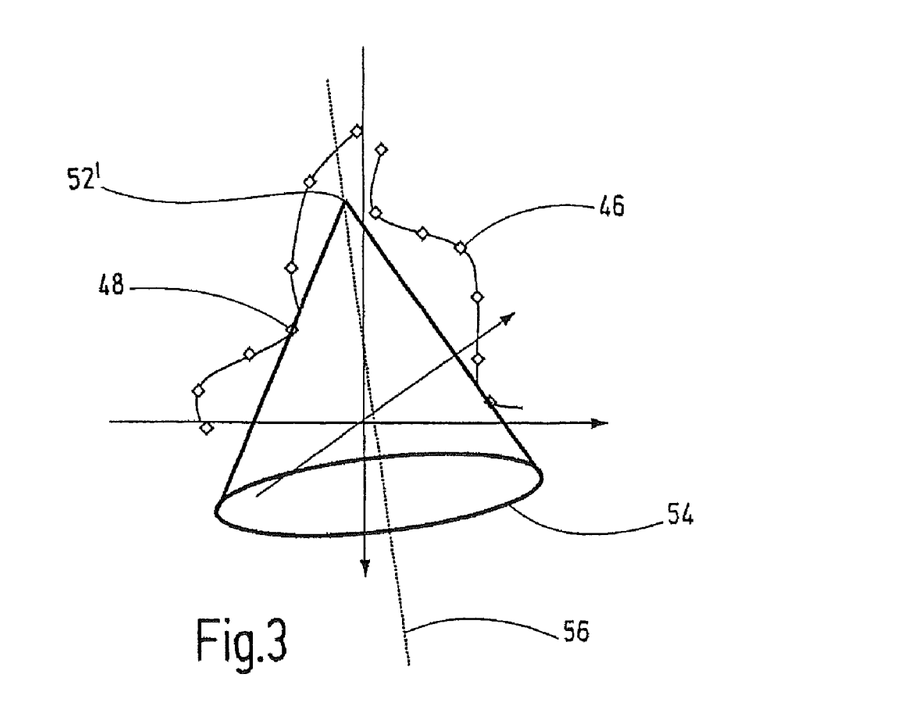
FIG. 3 shows an inscribed cone as an example of a tangential conical substitute element for the point cloud from FIG. 2.

FIG. 3 therefore shows a further conical substitute element 54 for the same point cloud. The substitute element is an inscribed cone in this case, i.e. the largest possible cone that fulfills the condition of inscription (all measurement points 46, 48 lie outside the smallest possible substitute element). As can be seen in comparison with FIGS. 2 and 3, the cone axis 56 of the inscribed cone 54 can run in a direction other than the cone axis of the minimum cone 44. Likewise, the cone apex 52' lies at a position other than the cone apex 52 of the minimum cone.

In addition, the position of the cone apex 52' on the cone axis 56 can vary when the aperture angle of the cone is varied simultaneously. A "narrow" cone with a small aperture angle could be pushed further upward on the cone axis 56. By contrast, the inscribed cone 54 would lie deeper given a larger cone angle. Consequently, the inscribed cone 54 is not uniquely defined without specifying a secondary condition, if the detour of a cylindrical intermediate element is not adopted, as is described in DE 10 2005 030 274 A1 mentioned at the beginning.

However, the detour via a cylindrical intermediate element can be saved by means of the novel method and the novel device. Initially, reference may be made for the explanation to FIG. 4, in which the same reference symbols denote the same elements as before.

Figure 4:
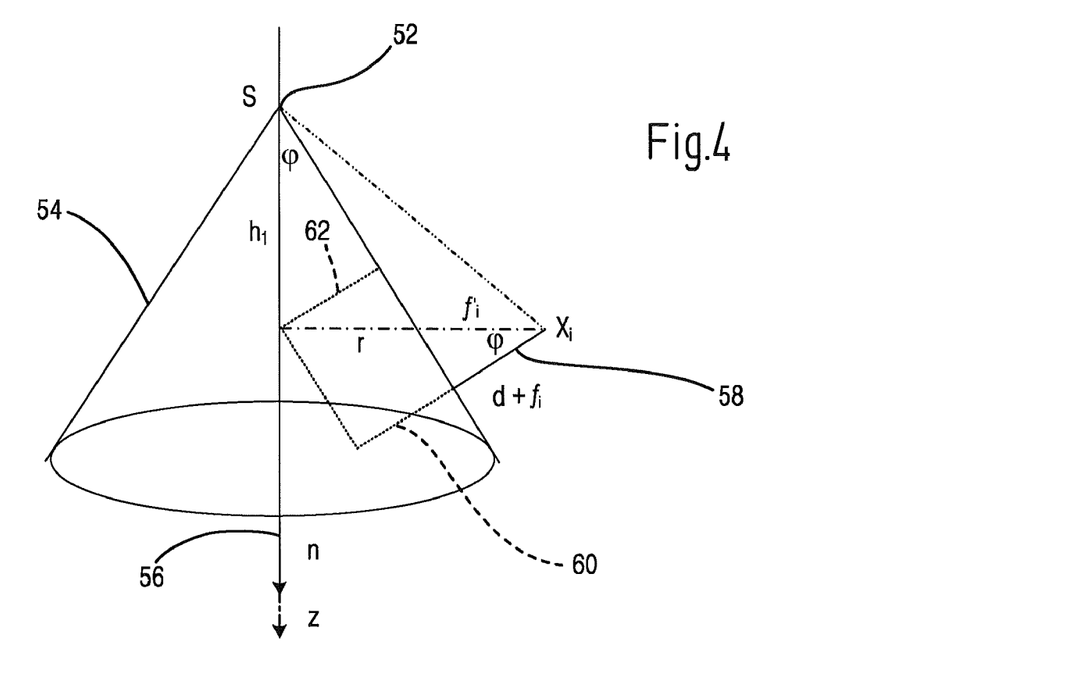
FIG. 4 shows a schematic of a cone for the purpose of explaining a first exemplary embodiment of the novel method.

For the sake of simplicity, FIG. 4 illustrates a cone such that the cone axis 56 lies on the coordinate axis z of the coordinate system used. However, this assumption does not restrict the general validity of the following explanations, since a cone 54 can in each case be displaced and rotated by means of a coordinate transformation such that this assumption is fulfilled. As an alternative to this, the coordinate system can be appropriately defined.

It may be assumed that the origin of the coordinate system lies here at the cone apex 52. This assumption, as well, serves to simplify, and can be fulfilled at any time by means of a suitable coordinate transformation. The coordinates of a measurement point $X_i$ are $x_i$, $y_i$ and $z_i$ in this case. The measurement point $X_i$ lies at a perpendicular spacing $d+f_i$ from the lateral surface of the cone 54. This perpendicular spacing is denoted in FIG. 4 by reference numeral 58. It represents a difference value between the spatial coordinates of the measurement point $X_i$ and the conical substitute element 54. The difference value 58 has usually been considered overall as a deviation that must fulfill the condition of inscription in the case of an inscribed cone. According to the novel method, however, the difference value 58 is subdivided into at least two difference parameters, namely a first difference parameter $f_i$ and a second difference parameter d, whose sum represents the difference value (perpendicular spacing) between the conical substitute element and the measurement point at the location $X_1$.

Geometric observations can be used to derive the following relationship between the first difference parameter $f_i$ and the further parameters from FIG. 4:

$$f_i = \cos(\phi) \cdot \sqrt{x_i^2 + y_i^2} - d - z_i \sin(\phi) - (+) t_i$$

with $f_i$ being the first difference parameter,
d being the second difference parameter,
φ being the cone angle of the tangential conical substitute element,
$t_i$ being the probe ball radius of a feeler used, and
$x_i, y_i, z_1$ being the spatial coordinates of a measurement point relative to the suspension point of the tangential conical substitute element.

The first term $\cos(\phi) \cdot \sqrt{x_i^2 + y_i^2}$ corresponds to the cathetus having the two part lengths 58, 60. The further term $z_i \cdot \sin(\phi)$ is the length of the cathetus 62, which corresponds exactly to the part length 60. $t_i$ denotes the radius of the probe ball used at the free end of the feeler, if the measurement points 46, 48 are measured on a tactile coordinate measuring machine. The correction parameter $t_i$ can be omitted in the case of a coordinate measuring machine comprising a measuring head that measures in a contactless fashion.

The cone 54 has six degrees of freedom, that is to say it can be uniquely defined by six parameters. For example, the position of the cone apex 52 (three coordinates and therefore three degrees of freedom), the normal direction of the cone (cone axis, two degrees of freedom) and the cone angle φ (one degree of freedom) can be used in order to describe the cone 54. The above specified relationship can be used to set up a system of equations with six unknowns that correspond to these six degree of freedom. This system of equations can be solved via the known method for solving systems of equations when the spatial coordinates of at least six measurement points are available. The solution leads to a uniquely determined inscribed cone 54 by considering the condition of inscription $f_i \geq 0$ and d=Max.

An envelope cone can be uniquely determined when the system of equations is formulated by considering the condition of the envelop $f_i \leq 0$ and d=Min.

In other words, splitting the difference value 58 into the at least two difference parameters $f_i$ and d, together with the above-specified formulations of the conditions of the inscription and envelope, leads to two uniquely determined, tangential conical substitute elements that can be calculated directly from the spatial coordinates of the measured values without further a priori knowledge being assumed.

Figure 5:
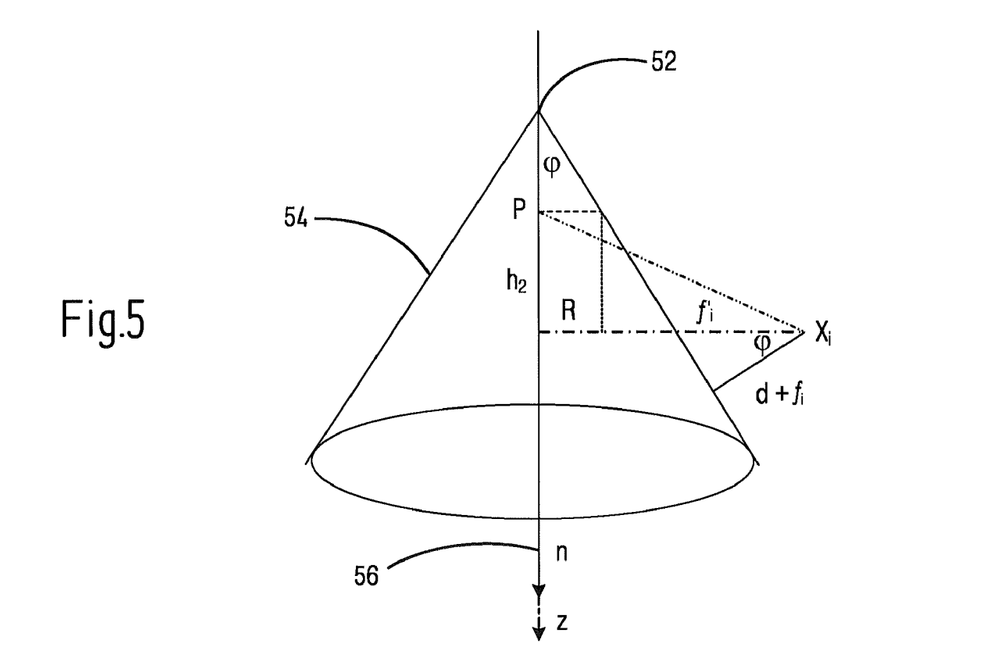
FIG. 5 shows a schematic of a cone for the purpose of explaining a second exemplary embodiment of the novel method.

FIG. 5 shows the cone 54 in another illustration. It may be assumed here that the origin of the coordinate system lies at the point P that is located below the cone apex 52 on the cone axis 56 (and thus on the coordinate axis z). The following relationship is valid for this illustration:

$f_i = \cos(\phi) \cdot (\sqrt{x_i^2 + y_i^2} - R) - d - z_i \cdot \sin(\phi) - (+) t_i$ with $f_i$ being the first difference parameter,
  d being the second difference parameter,
  φ being the cone angle of the tangential conical substitute element,
  R being the radius of the tangential conical substitute element at the suspension point,
  $t_i$ being the probe ball radius, and
  $x_i, y_i, z_i$ being the spatial coordinates of a measurement point relative to the suspension point of the tangential conical substitute element.

It is also possible with this relationship to set up a system of equations of six unknowns by means of which the six degrees of freedom of the substitute cone can be uniquely determined, when the above specified conditions for the inscribed cone and the envelope cone are again applied.

Figure 6:
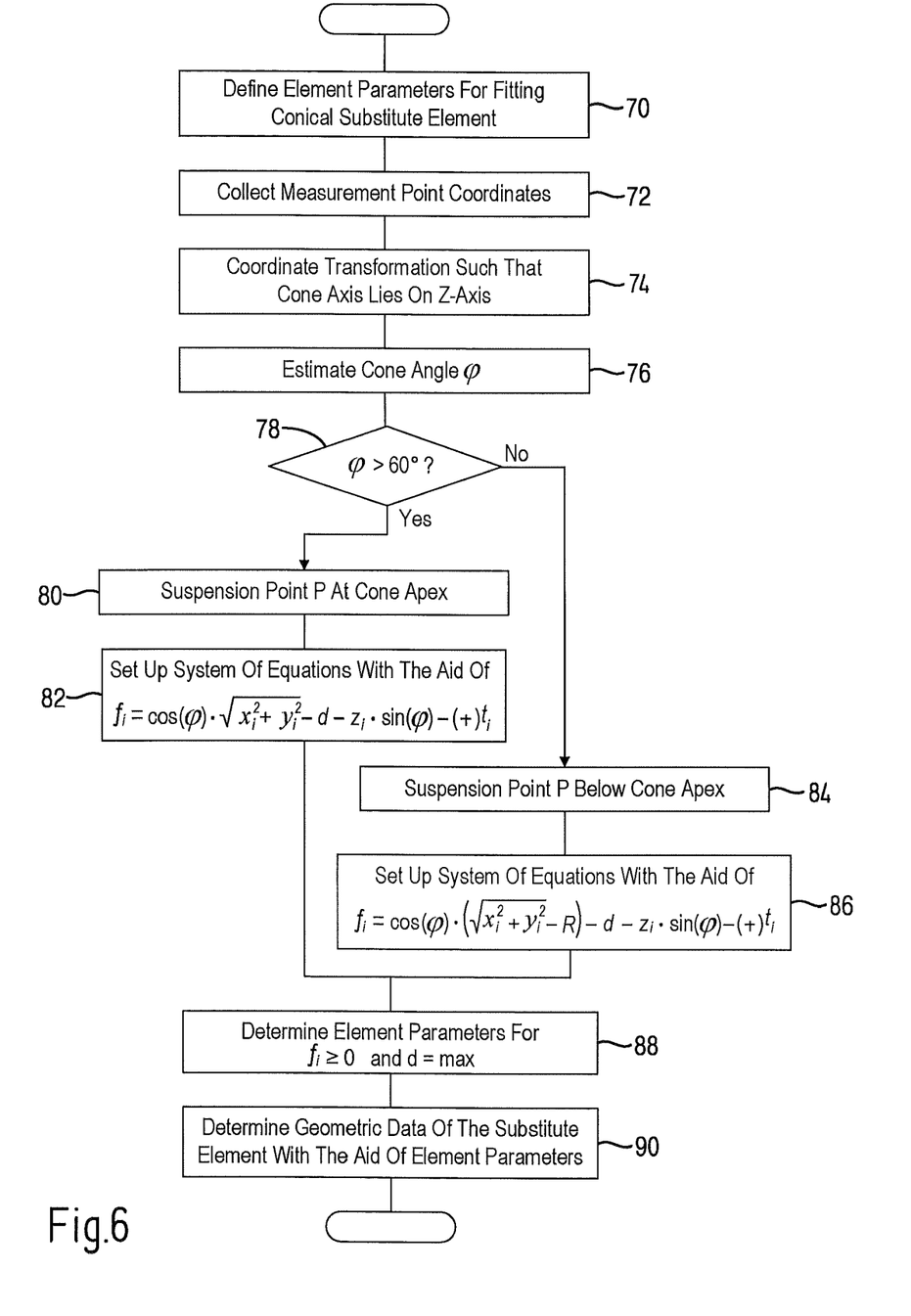
FIG. 6 shows a flow chart for explaining a preferred exemplary embodiment of the novel method.

FIG. 6 shows a preferred exemplary embodiment of the novel method by means of a simplified flow chart. In accordance with step 70, the element parameters are firstly defined for a tangential conical substitute element, as has been explained with reference to FIGS. 4 and 5. The six element parameters represent the six degrees of freedom of a cone, especially the position of the cone axis, the cone angle and at least one suspension point of the cone on an axis of the fundamental coordinate system. In accordance with FIG. 4, the suspension point can be the cone apex 52. In accordance with FIG. 5, the suspension point can also be any desired point P along the coordinate axis.

In accordance with step 72, spatial coordinates of selected measurement points on the measurement object 30 are determined. In accordance with step 74, which is optional, a coordinate transformation is performed in such a way that the substitute cone comes to lie with its cone axis on the z-axis of the coordinate system. Subsequently, in accordance with step 76 the cone angle φ is roughly estimated, and this can be done, for example, by means of a minimum cone as substitute element.

In accordance with step 78, a distinction of cases is carried out, the distinction here being whether the estimated cone angle φ is greater than 60°, for example, or not. When the estimated cone angle is greater than 60°, the suspension point P of the substitute cone is defined in the cone apex (step 80, FIG. 4), and in accordance with step 82 a system of equations with six unknowns is set up, as was explained by means of FIG. 4.

If the estimated cone angle is not greater than 60°, the suspension point of the substitute cone is assumed in accordance with step 84 to be below the cone apex, and the system of equations is set up in accordance with step 86, as was explained further above by means of FIG. 5.

In accordance with step 88, the respective system of equations is subsequently solved using at least six measurement point coordinates, wherein FIG. 6 shows a case where it is assumed that an inscribed cone is to be determined. As an alternative to this, the system of equations could also be solved by considering the criteria of circumscription in order to determine a envelope cone.

In accordance with step 90, geometric data such as, for example, the cone angle, the position of the cone axis or a cone diameter are subsequently determined for the substitute element. These geometric data represent geometric data of the conical measurement object.

What is claimed is:
1. A method for determining geometric data of a conical measurement object, the method comprising the steps of:
  (a) determining at least six spatial coordinates at least six different measurement points on the conical measurement object,
  (b) determining a tangential conical substitute element for the measurement object using the at least six spatial coordinates, and
  (c) determining the geometric data of the measurement object by means of the tangential conical substitute element,
  wherein step (b) comprises the substeps of
  (b1) defining at least six element parameters that represent a cone axis of the tangential conical substitute element, a cone angle of the tangential conical substitute element, and a suspension point of the tangential conical substitute element on the cone axis, and
  (b2) calculating the at least six element parameters using the at least six spatial coordinates and using a system of equations,
  wherein the system of equations describes difference values between the spatial coordinates and the tangential conical substitute element,
  wherein each difference value is modeled by means of at least two difference parameters whose sum represents a perpendicular spacing between the tangential conical substitute element and a spatial coordinate, and
  wherein a first one of the at least two difference parameters defines a solution condition in the form of a limit value, and a second one of the at least two difference parameters defines a solution condition in the form of an extreme value.

2. The method of claim 1, wherein the at least six spatial coordinates are determined by means of a coordinate measuring machine defining a coordinate system having at least one coordinate axis, and wherein the spatial coordinates are transformed before substep (b2) such that the cone axis of the tangential conical substitute element falls at least approximately onto the coordinate axis.

3. The method of claim 1, wherein an envelope cone is determined as the tangential conical substitute element by virtue of the fact that the first difference parameter defines a limit value less than or equal to zero, and the second difference parameter defines a minimum value as extreme value.

4. The method of claim 1, wherein an inscribed cone is determined as the tangential conical substitute element by virtue of the fact that the first difference parameter defines a limit value of greater than or equal to zero, and the second difference parameter defines a maximum value as extreme value.

5. The method of claim 1, wherein the system of equations represents the following relationship:

$$f_i = \cos(\phi) \cdot \sqrt{x_i^2 + y_i^2} - d - z_i \cdot \sin(\phi) - (+)t_i$$

with $f_i$ being the first difference parameter,
d being the second difference parameter,
$\phi$ being the cone angle of the tangential conical substitute element,
$t_i$ being a probe ball radius of a feeler used, if appropriate, and
$x_i, y_i, z_i$ being the spatial coordinates of a measurement point relative to the suspension point of the tangential conical substitute element.

6. The method of claim 1, wherein the system of equations represents the following relationship:

$$f_i = \cos(\phi) \cdot (\sqrt{x_i^2 + y_i^2} - R) - d - z_i \cdot \sin(\phi) - (+)t_i$$

with $f_i$ being the first difference parameter,
d being the second difference parameter,
$\phi$ being the cone angle of the tangential conical substitute element,
R being a radius of the tangential conical substitute element at the suspension point,
$t_i$ being a probe ball radius of a feeler used, if appropriate, and
$x_i, y_i, z_i$ being the spatial coordinates of a measurement point relative to the suspension point of the tangential conical substitute element.

7. The method of claim 1, wherein the cone angle of the tangential conical substitute element is estimated before substep (b2), in order to obtain an estimated cone angle of the tangential conical substitute element, and wherein the suspension point of the tangential conical substitute element is defined as a function of the estimated cone angle.

8. The method of claim 1, wherein at least one of the following variables is determined by means of the second conical substitute element: position of the measurement object, alignment of the measurement object, length dimension of the measurement object, cone angle of the measurement object.

9. A computer program product comprising a storage medium and program code stored on the storage medium, wherein the program code is designed to carry out a method according to the following steps, when the program code is executed on a computer:

a) determining at least six spatial coordinates at least six different measurement points on the conical measurement object,
b) determining a tangential conical substitute element for the measurement object using the at least six spatial coordinates, and
c) determining the geometric data of the measurement object by means of the tangential conical substitute element, wherein step b) comprises the substeps of
b1) defining at least six element parameters that represent a cone axis of the tangential conical substitute element, a cone angle of the tangential conical substitute element, and a suspension point of the tangential conical substitute element on the cone axis, and
b2) calculating the at least six element parameters using the at least six spatial coordinates and using a system of equations, wherein the system of equations describes difference values between the spatial coordinates and the tangential conical substitute element,
wherein each difference value is modeled by means of at least two difference parameters whose sum represents a perpendicular spacing between the tangential conical substitute element and a spatial coordinate, and
wherein a first one of the at least two difference parameters defines a solution condition in the form of a limit value, and a second one of the at least two difference parameters defines a solution condition in the form of an extreme value.

10. A device for determining geometric data of a conical measurement object, comprising:
a moveable measuring head and position-measuring devices in order to determine a spatial position of the measuring head,
a memory for storing a plurality of spatial coordinates of a plurality of measurement points on the measurement object, and
an evaluation unit for determining a tangential conical substitute element for the measurement object by using the spatial coordinates, and for determining the geometric data of the measurement object by means of the substitute element,
wherein the memory is designed to store at least six spatial coordinates of at least six different measurement points of the measurement object,
wherein the evaluation unit is designed to calculate at least six element parameters by using the at least six spatial coordinates and by using a system of equations,
wherein the at least six element parameters represent a cone axis of the tangential conical substitute element, a cone angle of the tangential conical substitute element, and a suspension point of the tangential conical substitute element on the cone axis,
wherein the system of equations describes difference values between the spatial coordinates and the tangential conical substitute element,
wherein each difference value is modeled by means of at least two difference parameters whose sum represents a perpendicular spacing between the tangential conical substitute element and a spatial coordinate, and
wherein a first one of the at least two difference parameters defines a solution condition in the form of a limit value, and a second one of the at least two difference parameters defines a solution condition in the form of an extreme value.

11. The device of claim 10, wherein the system of equations represents the following relationship:

$$f_i = \cos(\phi) \cdot \sqrt{x_i^2 + y_i^2} - d - z_i \cdot \sin(\phi) - (+) t_i$$

with $f_i$ being the first difference parameter,
  d being the second difference parameter,
  $\phi$ being the cone angle of the tangential conical substitute element,
  $t_i$ being a probe ball radius of a feeler used, if appropriate, and
  $x_i, y_i, z_i$ being the spatial coordinates of a measurement point relative to the suspension point of the tangential conical substitute element.

12. The device of claim 10, wherein the system of equations represents the following relationship:

$$f_i = \cos(\phi) \cdot (\sqrt{x_i^2 + y_i^2} - R) - d - z_i \cdot \sin(\phi) - (+) t_i$$

with $f_i$ being the first difference parameter,
  d being the second difference parameter,
  $\phi$ being the cone angle of the tangential conical substitute element,
  R being a radius of the tangential conical substitute element at the suspension point,
  $t_i$ being a probe ball radius of a feeler used, if appropriate, and
  $x_i, y_i, z_i$ being the spatial coordinates of a measurement point relative to the suspension point of the tangential conical substitute element.

13. The device of claim 10, wherein the evaluation unit is configured to determine at least one of the following variables by means of the second conical substitute element: position of the measurement object, alignment of the measurement object, length dimension of the measurement object, cone angle of the measurement object.

* * * * *

UNITED STATES PATENT AND TRADEMARK OFFICE
CERTIFICATE OF CORRECTION

| | | |
|---|---|---|
| PATENT NO. | : 7,996,180 B2 | |
| APPLICATION NO. | : 12/546825 | |
| DATED | : August 9, 2011 | |
| INVENTOR(S) | : Ulrich Staaden | |

It is certified that error appears in the above-identified patent and that said Letters Patent is hereby corrected as shown below:

Column 10,
Line 41, "coordinates at least" should be -- coordinates at at least --.

Column 11,
Line 63, "A computer program product" should be -- A non-transitory computer readable storage medium --.

Column 12,
Line 1, "coordinates at least" should be -- coordinates at at least --.

Signed and Sealed this
Twenty-first Day of February, 2012

David J. Kappos
*Director of the United States Patent and Trademark Office*